3,136,621
REDUCTION OF FERRIC CHLORIDE WITH AN ALUMINUM COMPOUND $R_2AlY$ IN AN INERT ORGANIC REACTION MEDIUM
Tillmon H. Pearson, Baton Rouge, La., assignor to Ethyl Corporation, New York, N.Y., a corporation of Virginia
No Drawing. Filed Sept. 17, 1962, Ser. No. 224,231
3 Claims. (Cl. 75—.5)

This invention relates to the manufacture of finely subdivided metals. More particularly, the invention relates to a new and efficient process for the manufacture of finely divided iron powder and a useful side product.

Finely divided iron powders are receiving increasing usage for various purposes. For example, iron powders are employable for pressing into shapes, to be followed by sintering to produce small objects of intricate design, thus eliminating the need for expensive and complicated machining operations. Another use for finely divided iron powders is as a starting material for the manufacture of high strength magnets.

The object of the present invention is to provide a new and improved process for the manufacture of finely divided, relatively uniform, iron particles of very small size, specifically, in the range of one to 50 microns, and preferably, from one to ten microns.

According to the present process, ferric chloride, $FeCl_3$, is reacted with a compound of the formula $R_2AlY$, wherein each R is an alkyl group having up to about 12 carbon atoms, and Y is selected from the group consisting of alkyl groups and hydrogen, the said aluminum compounds being provided in proportions of at least about 3 moles per mole of the ferric chloride. The reaction is preferably carried out with vigorous agitation, and in the presence of a liquid reaction medium which is inert to the reaction and is a solvent for a dialkyl aluminum chloride corresponding to the aluminum reactant. Typical reaction mediums employed are relatively stable ethereal type compounds such as tetrahydrofuran, the di-lower alkyl ethers of lower polyethylene glycols, the di-lower alkyl ethers of ethylene glycol, simple dialky ethers, hydrocarbons and normally liquid halogenated hydrocarbons. After completion of the reaction, the iron powder released is distributed in the reaction medium. A brief settling period is provided, and then the mixture is filtered to separate the iron powder, which is then dried under an inert gas atmosphere. Concurrently formed with the iron powder is a dialkyl aluminum chloride, dissolved in the liquid reaction medium and recoverable therefrom.

In the following working examples illustrating the invention more specifically, all parts and proportions are by weight, unless otherwise specified.

*Example 1*

Ten parts of reagent grade ferric chloride were mixed with about 72 parts of tetrahydrofuran. A solution of about 28 percent triethyl aluminum (93 percent $(C_2H_5)_3Al$, 7 percent diethyl aluminum hydride and other alkyl aluminum compounds, was prepared. The triethyl aluminum solution was added in several increments, the total corresponding to 3.4 moles of triethyl aluminum per mole of ferric chloride. Some warming occurred initially by the reaction of the materials, and thereafter heat was applied and the system was refluxed for about three hours. A moderate amount of gaseous hydrocarbons were driven off. The mixture was then cooled under a nitrogen atmosphere.

During the reaction, the reacting mixture turned dark brown to black as finely divided solids were formed. The solids were removed from the liquid phase by filtration on a medium glass frit, under a dry, inert gas atmosphere. The solids were then dried by aspirating dry nitrogen gas through the filter cake. The filtrate contained diethyl aluminum chloride in good purity, accompanied by minor quantities of excess triethyl aluminum. Examination of the particles microscopically showed that the particles were roundish-solids of about one micron in size, with a substantial proportion being loosely agglomerated in clumps having maximum dimensions of from 10 to 50 microns. The said agglomerates can be readily broken up if desired by mild attrition milling.

Portions of the powder exhibited high reactivity when analyzed, showing the extremely high surface and reactivity thereof. These particles are susceptible to ready pressing into final shapes of intricate design by application of 1,000 to 25,000 pounds per square inch forming pressure, and also are suitable for making high strength magnets for electronic devices and the like.

To illustrate more fully additional variations of the invention, the following examples are given:

| Examples | Aluminum compound | Moles aluminum compound/ mole $FeCl_3$ | Reaction medium | Reaction medium amount, ml./g. $FeCl_3$ | Maximum temperatures |
|---|---|---|---|---|---|
| 2 | Tri-isobutyl aluminum $(iC_4H_9)_3Al$. | 3.2 | Dimethyl ether of diethylene glycol | 3 | 80 |
| 3 | Diethyl aluminum hydride $(C_2H_5)_2AlH$. | 5.0 | Methyl ethyl ether of diethylene glycol. | 11 | 70 |
| 4 | Tri-n-propyl aluminum $(C_3H_7)_3Al$. | 4.2 | Dimethyl ether of triethylene glycol | 15 | 60 |
| 5 | Trihexyl aluminum $(C_6H_{13})_3Al$. | 4.8 | Dibutyl ether of diethylene glycol. | 45 | 120 |
| 6 | 50% triethyl aluminum 50% diethyl aluminum hydride. | 3.1 | Tetrahydrofuran | 20 | 70 |
| 7 | Tridodecyl aluminum, $(C_{12}H_{25})_3Al$. | 4.9 | Diethyl ether | 11 | 40 |
| 8 | Triethyl aluminum $(C_2H_5)_3Al$. | 3.3 | 1,2-Dichloro-ethane | 13 | 80 |
| 9 | Triamyl aluminum $(C_5H_{11})_3Al$. | 4.3 | 2,2,4-trimethyl pentane. | 24 | 100 |
| 10 | Tri-isobutyl aluminum $(iC_4H_9)_3Al$. | 5.1 | Toluene | 21 | 111 |
| 11 | Trimethyl aluminum $(CH_3)_3Al$. | 4.3 | Dimethyl ether of ethylene glycol. | 7 | 70 |

In carrying out the foregoing operations, the most convenient procedure involves mixing the ferric chloride with a part or all of the reaction medium, before adding thereto the alkyl aluminum compound. Mixture of the alkyl aluminum compound with the liquid reaction medium is not essential, but is a convenient method of implementing easy control of the proportions of alkyl aluminum added.

The temperatures of operation employed are not highly critical, and, in fact, vary during the course of a batch reaction. Usually, a portion of the reaction occurs without the addition of heat, but in order to provide a good yield, heating to the normal boiling point of the reaction medium is customarily involved. Temperatures customarily employed vary from about 25 to 150° C., a preferred range being from 50 to 100° C. Where relatively volatile reaction media are used, pressure operation is frequently employed to assure reasonably rapid reaction. Ordinarily, a period of about one-half hour to five hours is used to drive the reaction to completion.

As evident from the working examples above given, various reaction media are readily available for the various embodiments of the process. As previously indicated, a requisite of the solvent or reaction medium is that it be relatively stable at the reaction conditions and be a good solvent for the dialkyl aluminum halides released as side products of the reaction. The proportions are not highly critical, and proportions of from 2 to 50 ml./gram of ferric chloride is a suitable range, a preferred range being 10 to 25 ml./g. In large operations, it is frequently desirable to use the reaction medium twice, first as a washing agent to remove trace impurities from the solids precipitated and filtered, and secondly as the reaction medium in a succeeding cycle.

The dialkyl aluminum chlorides generated by the process are valuable by-products, and are readily recovered for use or sale by fractionation of the liquid phase removed from the iron powder reaction. Dependent on the alkyl aluminum compound involved and the identity of the reaction medium, the solvent or the dialkyl aluminum chloride is fractionated off overhead. In certain instances, the said liquid phase can be combined with other components to form a polymerization catalyst system without removal or separation of the dialkyl aluminum chloride.

In addition to the liquid reaction media illustrated above, additional examples are hexane, heptane, octane, nonane, decane, benzene, dioxane, $\beta,\beta$-dichlorodiethyl ether, 1,2-dichloroethane, perchloroethylene, trichloroethylene, and others.

This application is a continuation-in-part of my prior application Serial No. 859,573, filed December 15, 1959, and now abandoned, which application was itself a continuation-in-part of my application Serial No. 513,634, filed June 7, 1955, and now abandoned.

I claim:

1. Process for concurrent manufacture of iron powder and a dialkyl aluminum chloride comprising reacting, at a temperature between about 25 and 150° C., ferric chloride and an aluminum compound $$R_2AlY$$

wherein
   R is an alkyl radical having up to twelve carbon atoms, and
   Y is a radical selected from the group consisting of an alkyl radical having up to twelve carbon atoms, and hydrogen, in the presence of an inert organic reaction medium, the aluminum compound being fed in proportions of at least about three moles per mole of ferric chloride, the inert organic reaction medium being selected from the group consisting of tetrahydrofuran, di-lower alkyl ethers of lower polyethylene glycols, di-lower alkyl ethers of ethylene glycol, simple dialkyl ethers, liquid hydrocarbons, and normally liquid halogenated hydrocarbons.

2. The process for the concurrent manufacture of iron powder having a particle size below about 10 microns, and a dialkyl aluminum chloride, comprising reacting, at a temperature of about 25 to 150° C., ferric chloride and an aluminum compound $$R_2AlY$$

wherein
   R is an alkyl radical having up to twelve carbon atoms, and
   Y is a radical selected from the group consisting of an alkyl radical having up to twelve carbon atoms, and hydrogen, in the presence of a stable liquid reaction medium selected from the group consisting of tetrahydrofuran, dimethyl ether of diethylene glycol, methyl ethyl ether of diethylene glycol, dimethyl ether of triethylene glycol, dibutyl ether of diethylene glycol, diethyl ether, 1,2-dichloroethane, 2,2,4-trimethyl pentane, toluene, and dimethyl ether of ethylene glycol, the reaction medium being in proportions of from 2 to 50 ml. per gram of ferric chloride, continuing the reaction for a period of from one-half to five hours and until the ferric chloride is essentially completely converted to iron powder, and recovering and drying the iron powder.

3. A process for the manufacture of finely divided iron powder and diethyl aluminum chloride comprising reacting ferric chloride and triethyl aluminum in tetrahydrofuran as a reaction medium, the reaction being carried out at reflux temperature for a reaction period of one-half to five hours, and the triethyl aluminum being provided in proportions of at least about three moles of triethyl aluminum per mole of ferric chloride, and separating and recovering the iron powder formed by said reaction.

References Cited in the file of this patent
UNITED STATES PATENTS

| | | |
|---|---|---|
| 2,781,410 | Ziegler et al. | Feb. 12, 1957 |
| 2,905,645 | Anderson et al. | Sept. 22, 1959 |